United States Patent [19]

Dogahara et al.

[11] Patent Number: 4,911,259
[45] Date of Patent: Mar. 27, 1990

[54] RUNNING CONTROL METHOD AND RUNNING CONTROL SYSTEM

[75] Inventors: Takashi Dogahara; Yoshiaki Danno, both of Kyoto, Japan

[73] Assignee: Mitsubishi Jidosha Kogyo Kabushiki Kaisha, Japan

[21] Appl. No.: 304,369

[22] Filed: Jan. 30, 1989

Related U.S. Application Data

[63] Continuation-in-part of Ser. No. 66,418, filed as PCT JP86/00549 on Oct. 30, 1986, published as WO87/02629 on May 7, 1987, abandoned.

[30] Foreign Application Priority Data

Oct. 31, 1985 [JP] Japan .............................. 60-242821

[51] Int. Cl.$^4$ ........................................... B60K 31/00
[52] U.S. Cl. ..................................... 180/170; 123/352; 123/361; 364/426.04
[58] Field of Search ................. 180/170; 123/399, 352, 123/361; 364/426.01, 426.04, 431.07

[56] References Cited

U.S. PATENT DOCUMENTS

| 4,112,885 | 9/1978 | Iwata et al. | 123/359 |
| 4,418,666 | 12/1983 | Yamauchi et al. | 123/339 |
| 4,453,516 | 6/1984 | Filsinger | 123/340 |
| 4,577,718 | 3/1986 | Ueno | 180/179 |

FOREIGN PATENT DOCUMENTS

| 3314800 | 10/1984 | Fed. Rep. of Germany | 180/170 |
| 2154763 | 9/1985 | United Kingdom | 123/399 |

Primary Examiner—Charles A. Marmor
Assistant Examiner—Eric Culbreth
Attorney, Agent, or Firm—Abelman Frayne Rezac & Schwab

[57] ABSTRACT

A running control method and a running control system for a vehicle to control the engine output according to the effects of slope, wind, and change in vehicle weight, in which a reference traction force is determined as the sum of a mechanism friction, an acceleration force, and an air drag, the difference between an actually measured total traction force an the reference traction force is determined to obtain an environmental effect value. The environmental effect value represents an increase or decrease in traction force with respect to that in a flat, windless road for a standard vehicle weight. A throttle valve or a fuel injection control governer is feedback-controlled according to the environmental effect value, thereby improving the control response.

3 Claims, 5 Drawing Sheets

RUNNING CONTROL METHOD AND RUNNING CONTROL SYSTEM

This application is a continuation-in-part of U.S. application Ser. No. 066,418, filed as PCT JP86/00549 on Oct. 30, 1986, published as WO87/02629 on May 7, 1987, now abandoned.

FIELD OF THE INVENTION

This invention relates to a running control method and a running control system having good response characteristics with no overshooting tendency.

BACKGROUND OF THE INVENTION

For a vehicle having an automatic transmission apparatus, there has been known a system of a type in which a target speed or acceleration of the vehicle is set according to the position of an acceleration pedal, and a throttle valve disposed in an air intake passage of an engine (or a fuel injection control governer for a diesel engine) is electronically controlled so that the target speed is reached. There has also been known an automatic speed control system that can set a target speed of the vehicle manually, in place of referring to the position of the acceleration pedal. In these prior art systems, the target speed and a measured speed of the vehicle have been compared and the vehicle speed has been feedback-controlled, but the feedback gain factor has not been changed according to the running condition of the vehicle.

With the above prior art systems, when a vehicle running at a constant speed enters an ascent in the road, the vehicle speed decreases and then, by the function of the feedback control, restores the original speed. However, the time for the restoration of the original speed depends on the gradient of the ascent and the number of passengers carried. When the feedback gain factor of the control system is increased, the response can be improved; however, this results in a hunting or an overshooting because the vehicle is an object of control with a substantial delay time. When the feedback gain factor of the control system is decreased, such a hunting or an overshooting can be prevented; however, this results in a defective response.

With a view to obviate all of the prior art defects of running control systems for a vehicle, it is a primary object of the present invention to provide a running control method and a system therefor, in which the feedback gain is controlled according to effects of slope, wind, and weight on the vehicle.

DISCLOSURE OF THE INVENTION

In a vehicle having a system of a type in which a target speed or acceleration and an actually measured speed or acceleration of the vehicle are compared to feedback control a throttle valve or a fuel injection control governer, the sum of a mechanism friction, an acceleration force, and an air drag is theoretically calculated to determine a reference traction force, and the difference between an actually measured total traction force and the reference traction force is assumed as an environmental effect value. The reference traction force represents a traction force for a vehicle of a standard weight running on a road which is flat, level, and windless. Thus the environmental effect value represents an increase or decrease from the reference traction force due to effects of slope, wind, and weight deviation of the vehicle. The response of the control becomes defective as the environmental effect value, for example, the gradient of the ascent increases. According to the present invention, when the environmental effect value of the ascent increases, the feedback gain factor is increased to improve the control response, and when the environmental effect value decreases, the feedback gain factor is decreased, thereby preventing generation of a hunting or an overshooting.

DESCRIPTION OF THE PREFERRED EMBODIMENTS

Preferred embodiments according to the present invention will now be described in detail with reference to the drawings.

Figure 1:
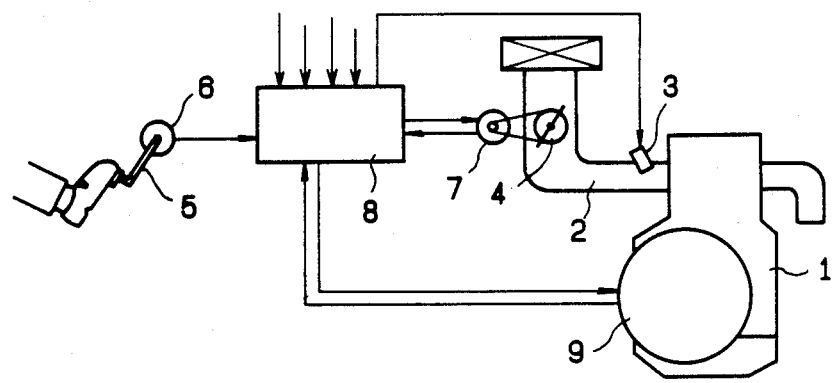
FIG. 1 is a schematic view showing a system for a vehicle used in a running control method of a first embodiment according to the present invention.
Figure 2:
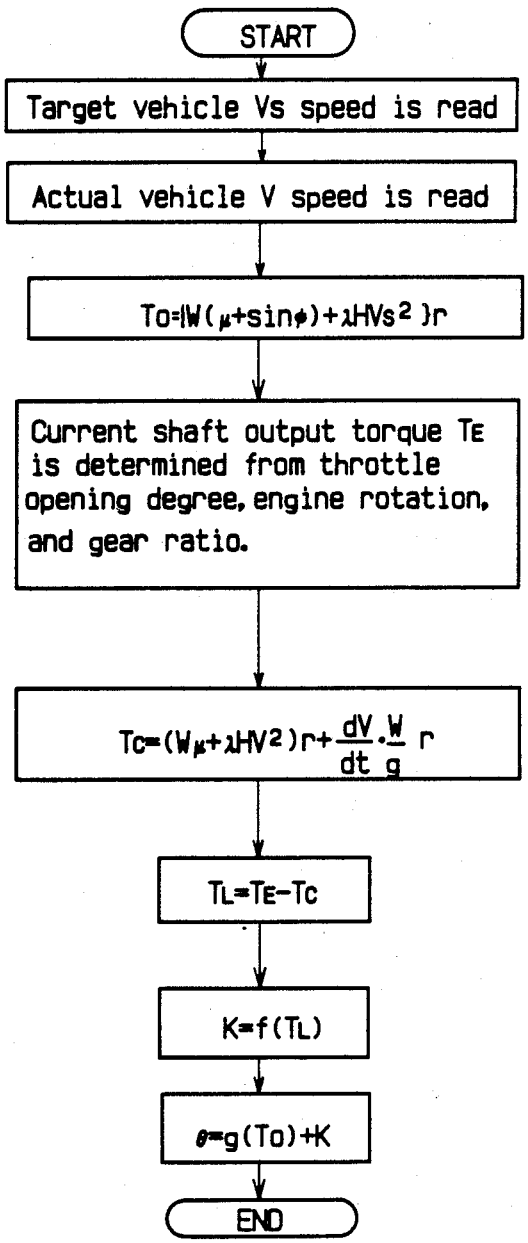
FIG. 2 and FIG. 3 are flow charts of the running control method used in first and second embodiments according to the present invention.

A first embodiment of the running control method according to the present invention is performed in a vehicle having a system shown in FIG. 1 according to a flow chart shown in FIG. 2. An injector 3 and a throttle valve 4 are disposed in an air intake passage 2 of an engine 1, and the throttle valve 4 has a stepping motor 7 to control the opening and closing of the throttle valve 4, of which degree of opening $\theta$ is inputted to a computer 8. An accelerator pedal 5 is provided with an accelerator position sensor (hereinafter referred to as APS) 6, and an accelerator position signal is inputted from the APS 6 to the computer 8. The computer 8 receives various signals and systematically judges them to drive the stepping motor 7 so that the degree of opening $\theta$ of the throttle valve 4 is feedback-controlled. When an electronically controllable automatic transmission 9 is used, Neutral position and Drive position can be detected to control the automatic transmission apparatus by the computer 8.

In this embodiment, a target vehicle speed Vs is set according to the accelerator position. This is because the driver of the vehicle would desire the vehicle to run at a constant speed with a constant accelerator position irrespective of a slope or a head wind. As shown in the flow chart in FIG. 2, the target vehicle speed Vs and an actual vehicle speed V are received by the computer 8, and the computer 8 theoretically calculates a steady running torque To at the target vehicle speed by the equation $$To = \{W(\mu + \sin\phi) + \lambda H Vs^2\}r$$

where,
r is an effective radius of tire,
W is a vehicle weight,
$\mu$ is a friction coefficient,
$\phi$ is gradient (zero in this case),
$\lambda$ is an air drag coefficient,
H is a front projection area, and
To is a steady running torque.

Then a current shaft output torque $T_E$ is determined from the throttle opening, engine rotation, and gear ratio used, using data which has been previously inputted to the computer 8. The torque $T_E$ represents an actual torque outputted by the engine 1 and is equal to the product of the total traction force and the effective tire radius. Other than the above calculation, the torque $T_E$ can also be directly measured using a torque sensor, such as of a contact type using a strain gauge or a non-contact magnetic type.

Then, a torque Tc is theoretically calculated using the following equation.

$$Tc = (W \cdot \mu + \lambda H V^2) r + \frac{dV}{dt} \cdot \frac{W}{g} \cdot r$$

where, $\frac{dV}{dt}$ is an acceleration, and
g is a gravitational acceleration.

Thus, a reference traction force is determined as the sum of the mechanism friction, acceleration force, and air drag, and then the reference traction force is multiplied by the effective tire radius to obtain the torque Tc. The torque Tc can be different from the actual torque $T_E$ because of effects of slope, wind, and change in weight of the vehicle. Therefore, $T_E = Tc$ when the vehicle is running on a road which is flat, level, and windless. The accuracy of the torque Tc is improved when an actual vehicle weight data is supplied by a vehicle weight sensor.

Then, a torque $T_L$ is determined by the following equation.

$$T_L = T_E - T_c$$

The $T_L$ is the total traction force subtracted by the reference traction force, which represents a change corresponding to the environmental effect value, showing an increase or decrease in torque due to effects of slope, wind, and change in weight of the vehicle.

Based on the $T_L$, a feed back gain K and the degree of opening $\theta$ of the throttle valve 4 are determined by the following equations.

$$K = f(T_L)$$

$$\theta = g(To) + K$$

where g(To) is a throttle opening degree necessary for the vehicle to steadily run at the target speed.

Description of $f(T_L)$

This means that the feedback gain K is given as a function of $T_L$.

EXAMPLE 1

With respect to a torque To, the feedback gain K is determined as:

$$K = f(T_L) = g(To + T_L) - g(To)$$

$$\theta = g(To) + K = g(To) + g(To + T_L) - g(To) = g(To + T_L)$$

Figure 4A:
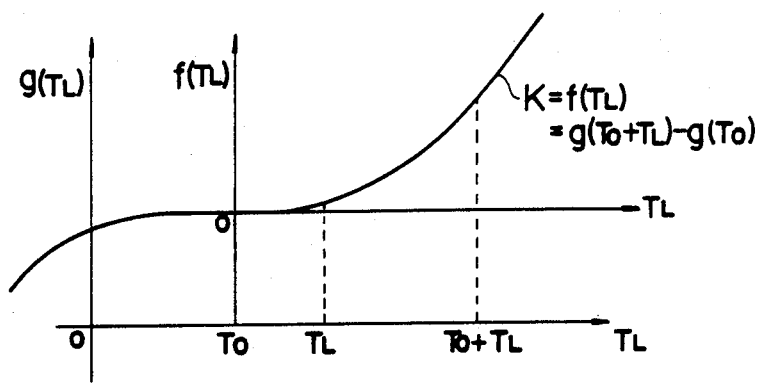
FIGS. 4a, 4b, 4c and 4d are diagrams illustrating the operational characteristics of an engine contolled by the method of the invention.

These are plotted as shown in FIG. 4a.

As a simplified method, assuming the torque $T_L$ to be almost proportional to the throttle opening $\theta$, and hence $g(T_L) \simeq CT_L$ (C: constant), the $f(T_L)$ is given as $$f(T_L) = g(To + T_L) - g(To) \simeq CT_L$$

EXAMPLE 2

With the feedback gain K assumed to be proportional to $T_L$, $f(T_L)$ is determined as $$K = f(T_L) = C \cdot T_L \text{ (C: constant)}$$

$$\theta = g(To) + K = g(To) + CT_L = C(To + T_L)$$

Thus, the result is same as the simplified Example 1.

Thus, $T_L$, that is an increase or decrease in torque as compared with that for a vehicle running on a flat, windless road with the basic vehicle weight, can be determined, and occurrence of hunting or overshooting can be pevented by adjusting the feedback gain K according to the value of $T_L$. For example, when the actual vehicle speed V is equal to the target vehicle speed Vs as a result of controlling the throttle valve 4, a throttle opening degree corresponding to the acceleration force can be subtracted to prevent overshooting. Further, when the vehicle is running on an ascent and the actual vehicle speed V is less than the target vehicle speed Vs, the throttle valve is opened to correct the difference in vehicle speed. However, when the vehicle enters a flat, level road, an overshooting tends to occur because the throttle valve has been opened larger. In such a case, if there is available a traction force data for an ascent, a throttle opening degree corresponding to the traction force can be given, thereby preventing overshooting.

Thus, the first embodiment according to the present invention has the means for preventing overshooting, which can provide a greater feedback gain in transition, thereby effectively controlling both the response and overshooting, which are in an antinomic relation.

This embodiment is described for the case in which the target vehicle speed is set. However, the present invention is not limited for the case only, but can also be applied to cases in which a target acceleration is set. Thus, the running control method according to the present invention can also be used in combination with an automatic speed control system.

A second embodiment of the running control method according to the present invention will be described with reference to FIG. 3. This embodiment is also applied to a vehicle having the system shown in FIG. 1.

Figure 3:
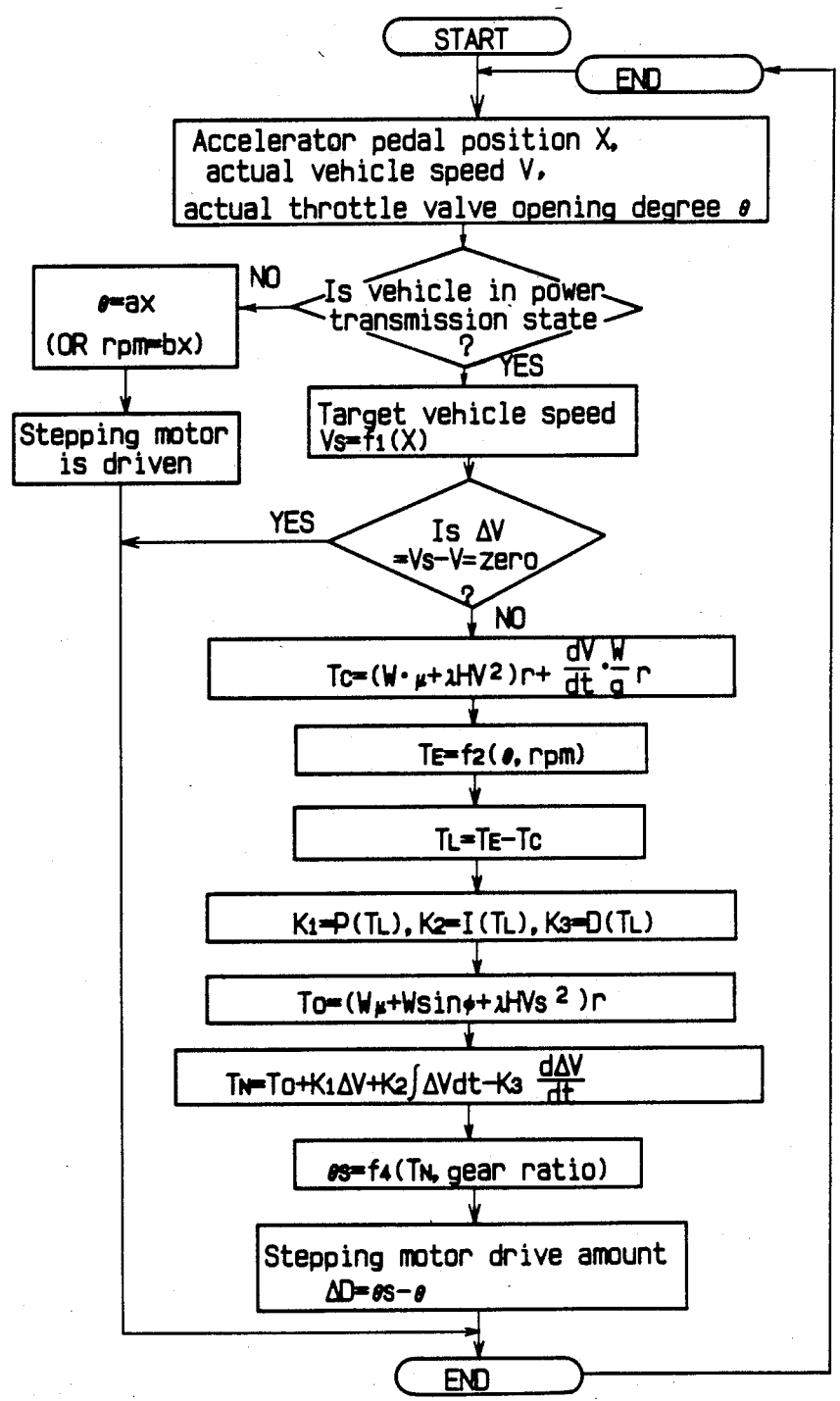

Referring to the flow chart shown in FIG. 3, an accelerator pedal position X, the actual vehicle speed V, and the actual throttle valve position $\theta$ are received by the computer 8, and the computer 8 judges whether or not the vehicle is in a power transmission state. When the vehicle is not in power transmission, the computer 8 derives the stepping motor 7 so that a throttle opening degree $\theta$ (or an engine rotation speed) proportional to the accelerator pedal position X is achieved. When the vehicle is in power transmission, the target vehicle speed Vs corresponding to the accelerator pedal position X is received by the computer 8, which is compared with the actual vehicle and, if the same, the process will be ended. if the target vehicle speed Vs is not the same as the actual vehicle speed, Tc and $T_E$ are calculated as in the first embodiment, to determine the difference $T_L$. Then, $K_1 = P(T_L)$, $K_2 = I(T_L)$, and $K_3 = D(T_L)$ are determined as functions of $T_L$.

Description of $K_1$, $K_2$, and $K_3$

The feedback gains $K_1$, $K_2$ and $K_3$ are functions of $T_L$, and these are used to determine To' synthetically in consideration of the speed, acceleration and other parameters. Since $K_2$ varies with time, of the equation given in the Specification $$To' = k_1\Delta V + k_2\int \Delta Vdt - K_3(d\Delta V/dt)$$

$K_2\int \Delta Vdt$ is rewritten exactly to as $\int(K_2\Delta V)dt$.

(1) $K_1 = P(T_L)$

Figure 4B:
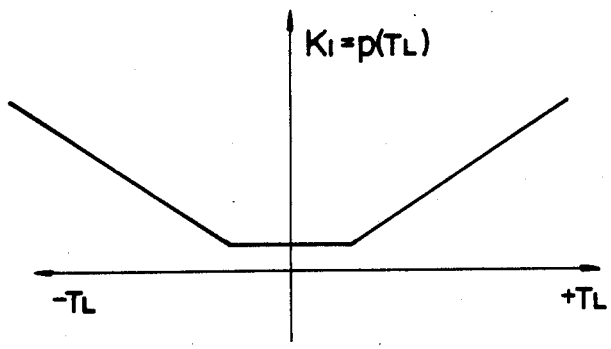

The function shown in FIG. 4b is used to that the gain is increased as $|T_L|$ increases, for faster convergence. When the value of $|T_L|$ is small, the gain is decreased to prevent occurrence of hunting.

(2) $K_2 = I(T_L)$

Figure 4C:
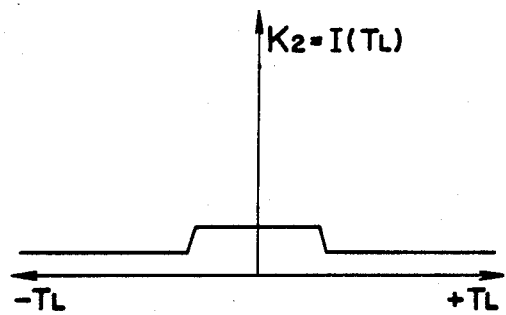

In the range where the value of $|T_L|$ is great, the function shown in FIG. 4c is used so that the gain $K_1$ functions predominantly, and the gain $K_2$ functions to prevent hunting and overshooting. In the range with small values of $|T_L|$, the gain $K_1$ is small, and the gain $K_2$ is increased to assure positive response and to shorten the convergence time. This will never increase overshooting tendency.

(3) $K_3 = D(T_L)$

Figure 4D:
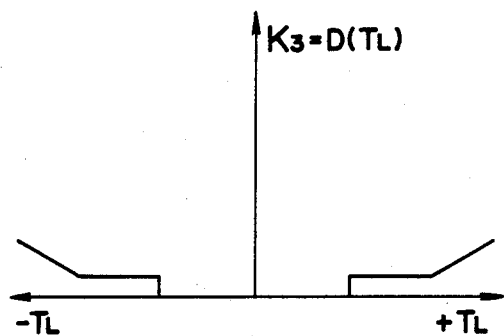

When the value of $|T_L|$ is substantially great, the gain $K_2$ becomes excessively high, and thus the gain $K_3$ is slightly increased to prevent overshooting (as shown in FIG. 4d). After that, as in the case of the first embodiment, the steadily running torque To at the target vehicle speed Vs is determined, which is then added with a feedback gain To' determined by the following equation, to obtain a $T_N$.

$$To' = K_1\Delta V + K_2\int \Delta Vdt - K_3\frac{d\Delta V}{dt}$$

The thus determined $T_N$ has a value including not only the environmental effect value $T_L/r$ but also the vehicle speed difference $\Delta V$. This is because the feedback gain To' is determined including the factors that the effect of the environmental effect value $T_L/r$ on the vehicle speed varies with the vehicle speed and the output characteristics of the engine depends on the engine type. Thus, the functions P, I, and D are determined taking these conditions into consideration so that the target vehicle speed is rapidly reached without overshooting and hunting.

Then the $T_N$ and a target throttle opening degree $\theta s$ corresponding to the gear ratio are determined, a stepping motor drive amount $\Delta D$ is calculated from the difference between the target throttle opening degree $\theta s$ and the actual throttle opening degree $\theta$ and, based on the result, the stepping motor 7 is driven.

In the above described embodiment, the output power of the engine 1 is controlled by the throttle valve 4. The running control method according to the present invention is not limitedly applied to such a system, but can also be applied to other systems using a fuel injection control governer or other devices. Although the target vehicle speed is set in this embodiment, the acceleration, engine rotation, engine output, or engine torque can also be used.

INDUSTRIAL APPLICATION OF THE INVENTION

As described in detail with reference to the embodiments, the running control method according to the present invention controls the feedback gain in dependence on the effects of slope, wind, and change in vehicle weight, thereby providing rapid achievement of the target vehicle speed or acceleration with improved response, without hunting or overshooting.

We claim:

1. A control system for a vehicle in which target conditions and actually measured values are compared to a feedback-control and an output control device for an engine, comprising:

running condition detecting means for detecting running conditions for the vehicle;

reference traction force calculating means for theoretically calculating the sum of total friction of the vehicle drive acceleration force of the vehicle, and an air drag on the vehicle from signals from said running condition detecting means assuming the vehicle as running on a flat, level, windless road to obtain a reference traction force;

current traction force calculating means for calculating a current traction force in dependence on signals from said running condition detecting means;

environmental effect value calculating means for determining an environmental effect value from a difference between said reference traction force and said current traction force;

setting means for setting one of a target vehicle speed and a target acceleration;

target torque setting means for calculating a theoretically required target torque in dependence on signals from said vehicle speed setting means;

differential measurement means for measuring speed and acceleration differences between one of a current vehicle speed and a current acceleration detected by said running condition detecting means and one of said target vehicle speed and said target acceleration;

feedback gain setting means for setting a feedback gain in dependence on said environmental effect value and said speed and acceleration difference; and, feedback control means for feedback controlling one of a throttle valve and a fuel injection control governer according to said target torque and said feedback gain, wherein said feedback gain setting means determines a feedback gain To' using the equation $$To' = K_1\Delta V + K_2\int \Delta Vdt - K_3\frac{d\Delta V}{dt}.$$

where $K_1$, $K_2$, and $K_3$ are coefficients given as $K_1 = P(T_L)$, $K_2 = I(T_L)$, and $K_3 = D(T_L)$, and $\Delta V$ is a difference between a target value and an actually measured value.

2. A control system for a vehicle in which target conditions and actually measured values are compared to a feedback-control and an output control device for an engine, comprising:

running condition detecting means for detecting running conditions for the vehicle;

reference traction force calculating means for theoretically calculating the sum of total friction of the vehicle drive acceleration force of the vehicle, and an air drag on the vehicle from signals from said running condition detecting means assuming the vehicle as running on a flat, level, windless road to obtain a reference traction force;

current traction force calculating means for calculating a current traction force in dependence on signals from said running condition detecting means;

environmental effect value calculating means for determining an environmental effect value from a difference between said reference traction force and said current traction force;

setting means for setting one of a target vehicle speed and a target acceleration;

target torque setting means for calculating a theoretically required target torque in dependence on signals from said vehicle speed setting means;

differential measurement means for measuring speed and acceleration differences between one of a current vehicle speed and a current acceleration detected by said running condition detecting means and one of said target vehicle speed and said target acceleration;

feedback gain setting means for setting a feedback gain in dependence on said environmental effect value and said speed and acceleration difference; and, feedback control means for feedback controlling one of a throttle valve and a fuel injection control governor according to said target torque and said feedback gain, wherein said reference resistance calculating means determines a reference Tc/r using the equation $$Tc = (W \cdot \mu + \lambda HV^2)r + \frac{dV}{dt} \cdot \frac{W}{g} \cdot r$$

where
W is an vehicle weight,
$\mu$ is a friction coefficient,
$\lambda$ is an air drag coefficient,
H is an front projection area,
V is an actual vehicle speed,
dV/dt is an acceleration,
g is a gravitational acceleration, and
r is an effective radius of tire.

3. A control system for a vehicle in which target conditions and actually measured values are compared to a feedback-control and an output control device for an engine, comprising:

running condition detecting means for detecting running conditions for the vehicle;

reference traction force calculating means for theoretically calculating the sum of total friction of the vehicle drive acceleration force of the vehicle, and an air drag on the vehicle from signals from said running condition detecting means assuming the vehicle as running on a flat, level, windless road to obtain a reference traction force;

current traction force calculating means for calculating a current traction force in dependence on signals from said running condition detecting means;

environmental effect value calculating means for determining an environmental effect value from a difference between said reference traction force and said current traction force;

setting means for setting one of a target vehicle speed and a target acceleration;

target torque setting means for calculating a theoretically required target torque in dependence on signals from said vehicle speed setting means;

differential measurement means for measuring speed and acceleration differences between one of a current vehicle speed and a current acceleration detected by said running condition detecting means and one of said target vehicle speed and said target acceleration;

feedback gain setting means for setting a feedback gain in dependence on said environmental effect value and said speed and acceleration difference; and, feedback control means for feedback controlling one of a throttle valve and a fuel injection control governor according to said target torque and said feedback gain, wherein said torque setting means determines a target torque To using the equation $$To = \{W(\mu + \sin \phi) + \lambda HV_s^2\}r$$

where
$\phi$ is a gradient, and
Vs is a target vehicle speed.

* * * * *